(12) United States Patent
Hardwick

(10) Patent No.: US 6,296,170 B1
(45) Date of Patent: Oct. 2, 2001

(54) METHOD OF PRODUCING METAL COMPOSITES WHICH CAN BE PROCESSED AT HIGH TEMPERATURES

(75) Inventor: Roy Hardwick, Troon (GB)

(73) Assignee: Sigmabond Technologies Corporation, Toronto (CA)

( * ) Notice: Subject to any disclaimer, the term of this patent is extended or adjusted under 35 U.S.C. 154(b) by 0 days.

(21) Appl. No.: 09/425,208

(22) Filed: Oct. 22, 1999

(51) Int. Cl.⁷ .................... B23K 20/08; B23K 39/00
(52) U.S. Cl. ............................ 228/107; 228/158
(58) Field of Search ........................... 228/107, 155, 228/158, 194

(56) References Cited

U.S. PATENT DOCUMENTS

| | | | |
|---|---|---|---|
| 3,604,103 | * | 9/1971 | Bonchak et al. ............... 29/472.3 |
| 3,798,011 | * | 3/1974 | Sharp, Jr. ....................... 29/197 |
| 4,023,936 | * | 5/1977 | Morse et al. .................... 428/679 |
| 4,612,259 | * | 9/1986 | Ueda ............................. 428/661 |
| 4,645,360 | * | 2/1987 | Eastwood et al. .............. 384/129 |
| 4,745,036 | * | 5/1988 | Trevison et al. ................ 428/652 |
| 4,837,928 | * | 6/1989 | Trevison et al. ................ 29/840 |
| 5,060,845 | * | 10/1991 | Suenaga et al. ................ 228/186 |
| 5,190,831 | * | 3/1993 | Banker ........................... 428/660 |
| 5,669,436 | * | 9/1997 | Papich et al. .................. 164/461 |
| 6,109,504 | * | 8/2000 | Groll .............................. 228/107 |

FOREIGN PATENT DOCUMENTS

61088986A * 5/1986 (JP) .

* cited by examiner

Primary Examiner—Tom Dunn
Assistant Examiner—Kiley Stoner
(74) Attorney, Agent, or Firm—Pillsbury Winthrop LLP

(57) ABSTRACT

A method whereby a composite clad metal ingot can be produced for onward processing at higher temperatures which are sufficient to allow the properties of the substrate material to be adequately controlled to meet specified requirements. These higher temperatures are required to avoid the undue levels of work hardening which occurs at the lower temperatures previously employed because of the need to avoid the formation of deleterious intermetallics at the bonded clad substrate interface. Such intermetallics are formed at temperatures above approximately 900° C. and should they be present, will weaken or destroy the bond.

9 Claims, 2 Drawing Sheets

METHOD OF PRODUCING METAL COMPOSITES WHICH CAN BE PROCESSED AT HIGH TEMPERATURES

FIELD OF THE INVENTION

This invention relates to the manufacture of clad metal composites incorporating a steel substrate which can be extended in area by hot rolling at temperatures which are sufficiently high to achieve optimum control of the steel properties, simultaneously preventing the growth of deleterious intermetallic products of the interface at the metal layers of the composite and maintaining the anti-corrosive properties of the cladder material.

BACKGROUND TO THE INVENTION

The roll bonding of expensive, corrosion resistant metals to steel or other cheaper substrate materials to form a clad composite material is well known. Such metal composite materials are used extensively in chemical, petrochemical and similar process plant to minimise the cost of such installations. This reduction in cost is achieved by using the cheaper substrate material to provide the composite with the required strength for structural requirements whilst the outer clad 'veneer' of expensive metal is of a minimum thickness sufficient to provide the necessary corrosion resistance.

Such composites can be made by a variety of methods, the most frequently used being that of roll bonding. This method requires the surfaces of the cladder and substrate materials to be cleaned and placed in contact with each other to form a loosely assembled composite package which is heated to a suitable temperature before passing between rolls which compress the parts together and progressively reduce the composite thickness. The resulting deformation causes the cladder and substrate components to bond at their interface to form a bonded clad composite of reduced thickness and extended area.

Not all cladder materials can be roll bonded in this manner because some such metals are incompatible for bonding to the chosen substrate material. Two such examples are titanium and zirconium which cannot be roll bonded directly to a steel or stainless steel substrate because of the formation of deleterious intermetallic substances at the interface at the temperatures which are required to effect the bond. In such cases, the otherwise incompatible substrate and cladder components are normally joined by explosive bonding them together at the final required thicknesses. This process is not only relatively expensive but it also has technical limitations which restrict the area and thickness of composite which can be produced. To produce comparatively large areas, quality assurance procedures must be highly detailed and rigorously enforced by skilled supervision and, despite this, high levels of rejection of defective components can be experienced which cannot be re-worked. Consequently, expensive material and labour replacement costs are incurred which must be catered for by contingency costing.

Ingots have also been produced by explosive bonding cladder and substrate materials of appropriate thickness proportions. These ingots then being heated and 'conversion rolled' to simultaneously extend the surface area and reduce the composite to the required overall thickness.

This technique is applicable to many cladder and substrate metal combinations and has also included titanium or zirconium explosively bonded to carbon and stainless steel substrates.

The more extensive use of this technique has been inhibited by the face that both titanium and zirconium, when bonded to these substrate materials, form brittle intermetallics at their bonded interface when heated to the high optimum temperatures necessary to provide the steel substrate with the mechanical properties defined in most pressure vessel specifications. These intermetallics form at temperatures above approximately, 850° C. and effectively weaken or destroy the bond. Consequently, it is necessary that the conversion rolling of the explosively bonded ingot be carried out at temperatures below 850° C. to avoid the formation of these intermetallics.

A further complication is that titanium also undergoes a phase change at approximately the same temperature that the growth of intermetallic occurs with the normal alpha structure of the titanium transforming to the beta phase. This has proved a further incentive to maintain conversion rolling temperatures below a temperature of 850° C. Previous work in these lower temperature ranges, in which the titanium exists in the alpha condition and is maintained at a temperature below that where intermetallics are formed, is defined in U.S. Pat. No. 4,612,259. This patent discloses the use of two or more interlayer materials to prevent the growth of titanium/steel intermetallics and defines the rolling temperatures as being below 850° C. and the selected interlayer materials include materials having melting points lower than the optimum rolling temperatures required to control the steel properties. Such materials will cause the titanium and steel substrate materials to separate due to the melting of these lower melting point interlayer materials if they are processed at the higher optimum temperatures necessary for adequate control of the steel properties.

Conversion rolling at temperatures of 850° C. and below, hardens the steel to a greater extent, making compliance with the accepted steel specifications extremely difficult. In commercial practice, where larger ingots are rolled to extended areas, an initial lower ingot temperature below 850° C., results in rapid cooling during the rolling to temperatures which require the reheating of the composite if the rolling is to continue without damaging the rolling mill and, consequently, any control of the steel properties is effectively relinquished. Such reheating also requires the use of additional furnaces which are, necessarily, extremely large to accommodate the greatly extended areas of the semi-rolled product.

Attempts have been made to control the mechanical properties of the steel, when rolling at temperatures below 850° C. by modifying the composition of the steel. This normally entails a reduction of the carbon content to levels such that the level of work hardening which occurs at these lower temperatures is reduced to acceptable levels. Such modified materials, however, are almost invariably unsuitable for the other fabrication procedures which remain to be completed during the further construction of the vessels in which the composite is incorporated. Consequently, these techniques have not proved viable as a production process.

Attempts have also been made to facilitate the roll bonding of titanium and zirconium to steel by the use of interlayer materials which are compatible with both the cladder and substrate components. Such interlayers are designed only to effect the roll bonding of the component materials, and are necessarily comparable or below those of the cladder and substrate materials. Such techniques have not proved to be a commercial success and have had only limited market acceptance due to variable bond quality over the area of the product. The lower melting point of these materials again necessitates their rolling at temperatures below the optimum required for the control of the steel properties thus limiting their use to applications in which corrosion resistance is the principal acceptance criterion and the mechanical properties of the steel are not of overriding importance. The lack of uniform bonding over the entire area of the clad interface has given such products a reputation as having unreliable mechanical properties.

The present invention overcomes the previously described limitations as the use of appropriate high melting point interlayer materials prevents the formation of intermetallics between steel and zirconium and between steel and titanium despite any phase changes which occur in the materials at the high rolling temperatures required to produce the required mechanical properties in the steel substrate. When the composite is eventually cooled in the normal manner to temperatures below approximately 850° C., titanium will revert to the original alpha phase condition. In the event that any titanium should remain in the beta phase form due to subsequent heat treatments required by the steel, for example quenching, this is of no consequence as the corrosion resistance of the titanium will remain unaffected.

SUMMARY OF THE INVENTION

An object of the present invention is to facilitate the conversion rolling of a composite metal ingot of cladder metal and substrate metal in the optimum range of temperatures necessary to provide the substrate metal with the required mechanical properties whilst also ensuring sound bonding of the cladder metal to the substrate metal throughout, and subsequent to, the processing of the said composite metal ingot.

To this end, the present invention provides a method of producing a composite material including a layer of metal cladder material and a metal substrate material, wherein an interlayer of metal material is interposed between said cladder material and said metal substrate, said interlayer material being bonded to said metal cladder and said metal substrate, said interlayer material being such that upon heating said composite material to temperatures required to hot form the said composite material and provide the said substrate metal with the required mechanical properties, the bonds between said cladder material and said interlayer material and between said substrate material and said interlayer material, are not adversely affected.

Advantageously, the interlayer material prevents the formation of intermetallics between the metal cladder and the metal substrate at the temperatures above 900° C. which are applied, in accordance with conventional practice of the steelmaking art, to provide the substrate metal with the required mechanical properties.

Advantageously, the interlayer material is a metal which does not form intermetallics with a cladder of titanium metal existing in the beta phase form and which is created at temperatures above approximately 850° C.

Preferably the interlayer material is a metal having a melting point higher than the metal cladder and metal substrate which does not form intermetallics at the desired rolling temperatures for the substrate material.

Preferably the interlayer material is explosively bonded to the layer of cladder metal. It is further preferable that the interlayer is bonded to the substrate metal.

Preferably the substrate metal is a steel and the cladder metal is a corrosion resistant metal. In one particularly preferred form of the invention, the substrate metal is a carbon or stainless steel and the corrosion resistant cladder metal may be titanium or zirconium or alloys of these materials. The interlayer material may be tantalum or niobium (columbium) or alloys of or between these materials.

In a preferred form, the present invention overcomes the aforementioned difficulties of the prior art by producing an ingot which incorporates the higher integrity of an explosive bond and which can be rolled at the optimum temperatures necessary to produce the required steel properties without adversely affecting the bond between the component materials. More specifically, the interlayer material prevents the formation of the intermetallics between the alpha or beta form of titanium and steel or zirconium and steel throughout the range of temperatures above 900° C. normally employed in the manufacture of steel having the desired properties.

In a preferred form of the invention, the bonds between the cladder and interlayer material and interlayer and substrate metal are manufactured by explosive bonding the interlayer and substrate materials but the invention is not limited to this method of fabrication of the bond and other practicable forms of bonding can be applied.

The invention is equally applicable to the process of production of clad pipe or tube by allowing cylindrical clad steel billets or hollows to be conventionally extruded at temperatures similar to those required for hot rolling. Explosively bonded starting stock in the form of billets can be used to manufacture the clad pipe by conventional manufacturing techniques without fear of adversely affecting the bond by growth of intermetallics and simultaneously allowing adequately high temperatures to be used which facilitate the required metal flow during extrusion and also produce the desired mechanical properties in the steel substrate material of the pipe.

In an alternative form of this application, a bond can be made between the cladder material and interlayer material and between the interlayer material and substrate material during the course of the extrusion process.

DISCUSSION OF PREFERRED EMBODIMENTS

The present invention will be better understood and appreciated from the following discussion of a number of preferred forms the invention may take.

Figure 1:
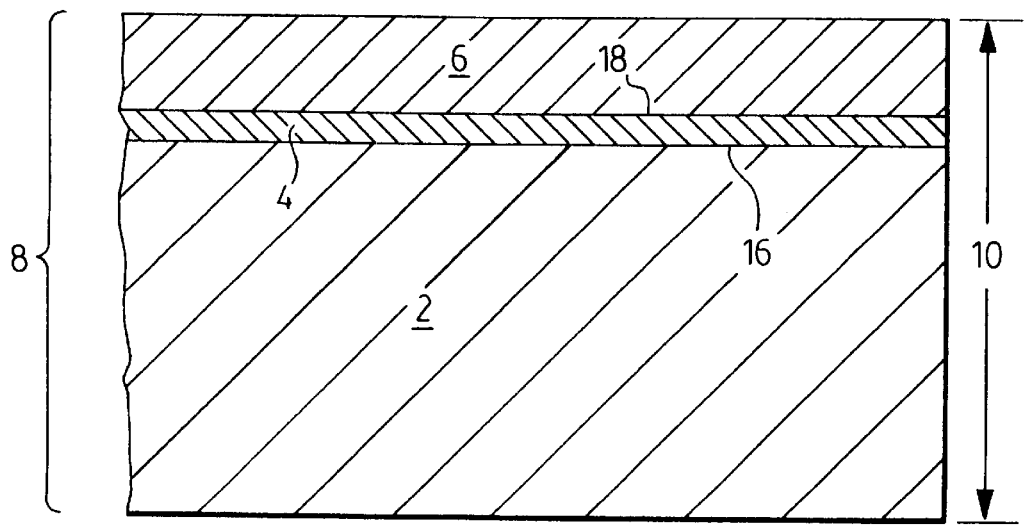
FIG. 1 shows a composite of a first embodiment of the present invention.

A first form of the invention will now be described with reference to FIGS. 1 and 2.

A first metal component, which may be carbon steel or stainless steel, forms the cheaper substrate (2) to which is explosively bonded in a first bonding operation, an interlayer (4) of a higher melting point material such as tantalum or niobium (columbium). After bonding, a cladder material (6) (such as, for example, titanium or zirconium and chosen on the basis of its corrosion resistance in a specific environment), is explosively bonded in a second operation to the surface of the interlayer material (4) to form a bonded composite (8) of substantial thickness (10) which is then heated to a temperature suitable for hot rolling which, in the case of the steel, will be a temperature in the order of 1200° C.

Figure 2:
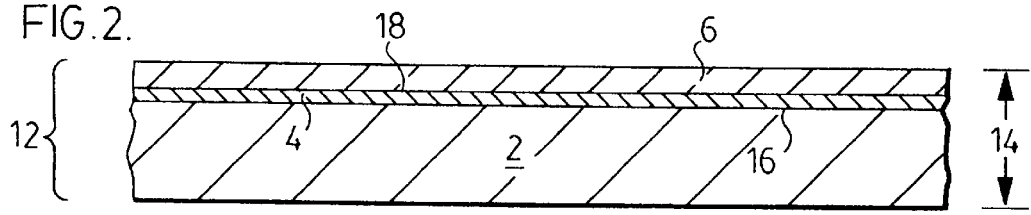
FIG. 2 shows the composite of FIG. 1 after hot forming.
Figure 3:
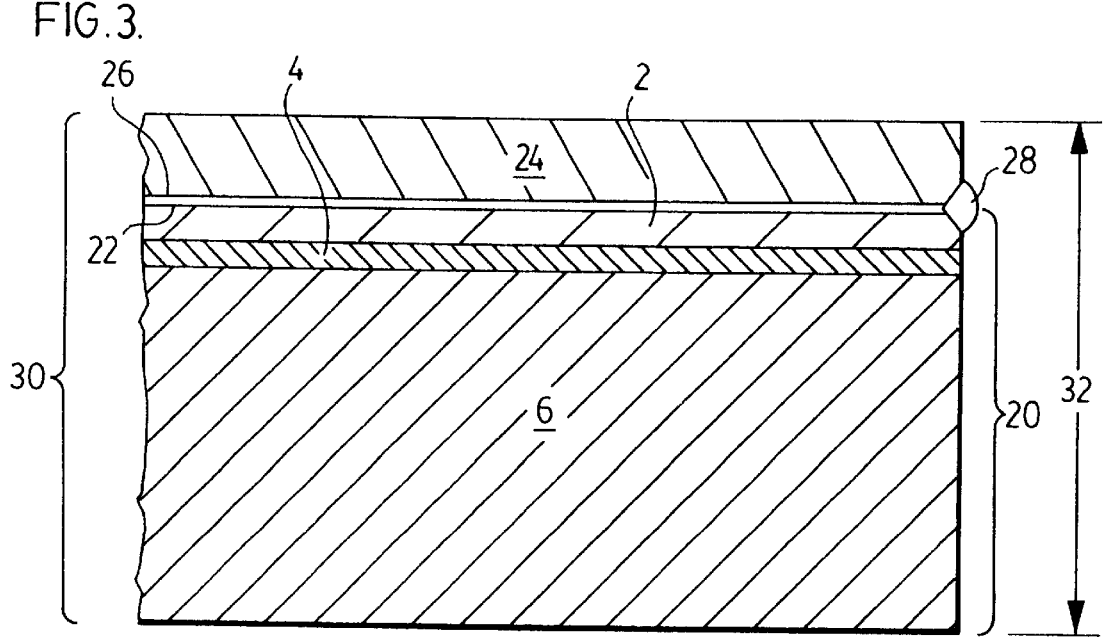
FIG. 3 shows a composite of a second embodiment of the present invention.

The heated bonded composite (8) is then hot rolled to extend the surface area with an associated reduction of the composite thickness (10) to produce a final composite (12) of the required final thickness (14) as shown in FIG. 2, with the thickness of the substrate (2), interlayer (4) and cladder (6) having been reduced proportionately. The high melting point interlayer material (4) does not form an intermetallic with the substrate metal (2) at the high rolling temperature of 1200° C. which is typical of temperatures used in the hot rolling reduction of steel and nor does it form an intermetallic with the cladder material (6) or the base material (4). Thus the bonded interface (16) between the substrate (2) and the interlayer (4) and the bonded interface (18) between the interlayer (4) and the cladder (6) remain unaffected by the temperature and rolling and, thereby, retain their integrity throughout the process of rolling.

An alternative method of producing the bonded composite (8) is to clad the substrate (2), interlayer (4) and cladder (6) in a single explosive bonding operation by conventional explosive bonding techniques. The resulting bonded composite (8) is then hot rolled at a temperature of 1200° C. in identical fashion to produce a final composite (12) at the required thickness (14) with the required mechanical properties in the steel substrate (2).

Another form of the invention will now be described with reference to FIGS. 3, 4, 5 and 6.

Figure 4:
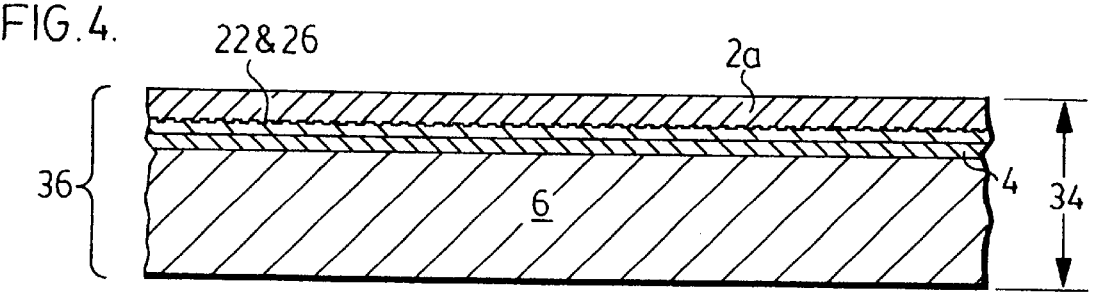
FIG. 4 shows the composite of FIG. 3 after hot forming.
Figure 5:
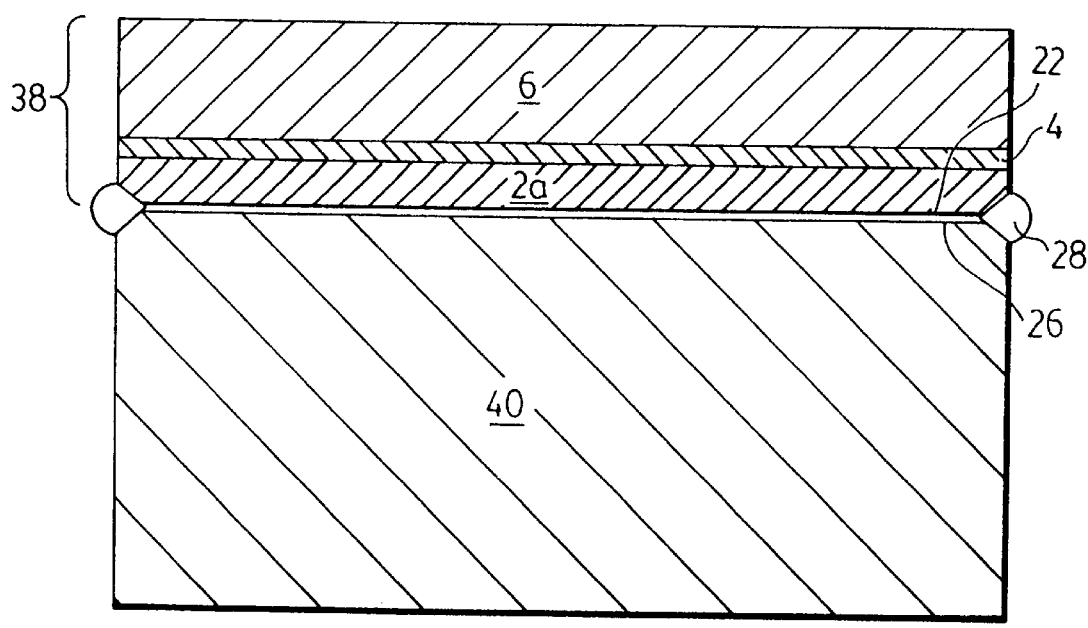
FIG. 5 shows a welded composite of a third embodiment of the present invention.

A substantially thick ingot of titanium or zirconium (6) is explosively clad with a high melting point interlayer material (4) such as tantalum or niobium and a layer of carbon or stainless steel (2) to form a first composite ingot (20), the explosive bonding being achieved either in a one or two stage operation. The outer surface (22) of the steel (2) is cleaned by grinding and a further steel component (24) with a similarly prepared surface (26) is placed upon the composite ingot (20) with the prepared surfaces (22) and (26) abutting. The interface is sealed with a fusion weld (28) and the composite assembly (30) of substantial thickness (32) is then heated to conventional rolling temperatures for steel and reduced to an appropriate thickness (34) as shown in FIG. 4. During the course of rolling, the two steel surfaces (22) and (26) are joined by roll bonding to effect a proportional increase in the thickness of the steel element (2a) which has been substantially increased in area during reduction of the thickness (32) to the thickness (34). This extended area is now sub-sectioned to form a number of smaller area individual components, one of which (38) is shown in FIG. 5.

Figure 6:
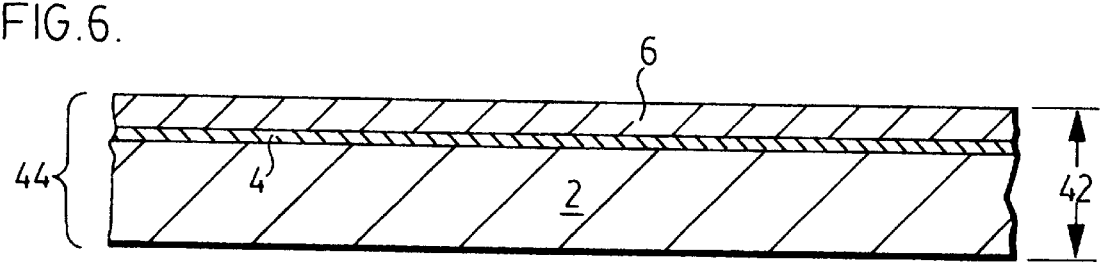
FIG. 6 shows the composite of FIG. 3 after hot forming.

The steel surface (22) of this component (38) is prepared by grinding and the composite (38) is placed upon a steel ingot (40) with a suitably prepared surface (26) and the interface is sealed with a fusion weld (28). This composite assembly is heated to conventional rolling temperatures and hot rolled to extend the surface area and effect a reduction to a final thickness (42) in the final product (44) as shown in FIG. 6, which now consists of a titanium cladding material (6), an interlayer (4) and steel substrate (2) with the desired proportional thickness.

During the course of the extensive reduction and heating cycles, the high melting point interlayer material (4) prevents the growth of intermetallics between the titanium (6) and steel (2) components which would otherwise occur in the absence of the interlayer (4), at the elevated temperature required to obtain the required properties in the steel (2), despite the substantial reduction in thickness of the interlayer (4) to microscopic proportions.

What is claimed is:

1. A method of producing a composite material, including a layer of metal cladder material and a metal substrate material wherein an interlayer material is interposed between said metal cladder material and said metal substrate material, which comprises bonding said metal interlayer material to said metal cladder material and said metal substrate material, and thereafter hot forming said composite material, said metal interlayer material being such that upon heating said composite material and hot forming at a temperature above 900° C., the bonds between said metal cladder material and said metal interlayer material and between said metal substrate material and said interlayer material are not adversely affected, the interlayer material preventing the formation of intermetallics and depletion of the bond between the substrate material and the cladder material, said metal substrate comprising carbon or stainless steel; the metal cladder material comprising titanium, alloy thereof, zirconium or alloy thereof; and the metal interlayer material comprising niobium, alloy thereof, tantalum or alloy thereof.

2. A method as in claim 1 in which the metal interlayer material has a melting point higher than the metal cladder material and the metal substrate material.

3. A method as in claim 1 in which the metal interlayer material is explosively bonded to the layer of metal cladder material and to the metal substrate material.

4. A method as in claim 1 in which the corrosion resistant metal cladder material is titanium or an alloy of titanium.

5. A method in claim 1 in which the corrosion resistant metal cladder material is zirconium or an alloy of zirconium.

6. A method as in claim 1 in which the metal interlayer material is niobium, or an alloy of niobium.

7. A method as in claim 1 in which the metal interlayer material is tantalum or an alloy of tantalum.

8. A method as in claim 1 wherein the composite material comprises layers of said metal substrate, metal cladder and metal interlayer materials in substantially flat plate or sheet form to provide a composite flat ingot and said ingot is hot rolled into final sheet or plate form while avoiding the formation of intermetallics between the metal cladder and metal substrate.

9. A method as in claim 1 wherein the composite material comprises layers of metal substrate, metal cladder and metal interlayer materials of substantially cylindrical form to provide a composite cylindrical billet and the hot forming comprises hot extruding said composite.

* * * * *